(12) United States Patent
Kai et al.

(10) Patent No.: US 11,679,455 B1
(45) Date of Patent: Jun. 20, 2023

(54) BASE-INTEGRATED BLADE MANUFACTURING METHOD

(71) Applicant: DISCO CORPORATION, Tokyo (JP)

(72) Inventors: Keiichi Kai, Tokyo (JP); Naruto Fuwa, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 18/055,508

(22) Filed: Nov. 15, 2022

(30) Foreign Application Priority Data

Dec. 1, 2021 (JP) .............................. JP2021-195294

(51) Int. Cl.
B23P 15/28 (2006.01)

(52) U.S. Cl.
CPC .................................... B23P 15/28 (2013.01)

(58) Field of Classification Search
CPC ...................................................... B23P 15/28
USPC ......................................................... 76/104.1
See application file for complete search history.

(56) References Cited

U.S. PATENT DOCUMENTS

| | | | | | |
|---|---|---|---|---|---|
| 4,152,816 A | * | 5/1979 | Ewing | ...................... | B22F 7/062 228/186 |
| 4,245,950 A | * | 1/1981 | Shiohata | .................... | F01D 3/02 415/103 |
| 4,509,900 A | * | 4/1985 | Odawara | ................. | F01D 5/025 416/198 A |
| 4,915,589 A | * | 4/1990 | Gessler | ................... | F01D 5/025 415/217.1 |
| 2008/0085659 A1 | * | 4/2008 | Stratti | ...................... | E21C 31/02 451/41 |
| 2010/0314176 A1 | * | 12/2010 | Zhang | ................... | E21B 10/567 175/428 |
| 2011/0174548 A1 | * | 7/2011 | Patel | ......................... | B23P 6/00 175/425 |
| 2013/0088364 A1 | * | 4/2013 | Bittar | ....................... | G01V 3/20 175/425 |
| 2015/0020666 A1 | * | 1/2015 | Wakita | ................... | B23B 31/307 83/401 |
| 2015/0020670 A1 | * | 1/2015 | Wakita | .................... | B27B 5/325 83/698.41 |
| 2020/0114432 A1 | * | 4/2020 | Gruber | ................... | B23K 26/34 |
| 2022/0203463 A1 | * | 6/2022 | Nagata | ..................... | B23P 15/34 |
| 2023/0072819 A1 | * | 3/2023 | Back | ....................... | B32B 15/18 |

FOREIGN PATENT DOCUMENTS

JP 2012135833 A 7/2012

* cited by examiner

*Primary Examiner* — Omar Flores Sanchez
(74) *Attorney, Agent, or Firm* — Greer Burns & Crain Ltd.

(57) ABSTRACT

There is provided a base-integrated blade manufacturing method for manufacturing a base-integrated blade by fixing a cutting blade having a circular opening to a base having an annular projection. The method includes a first step of preparing the base having the projection that has an outside diameter greater than a diameter of the opening of the cutting blade, and the cutting blade, a second step of lowering a temperature of the base and thus shrinking the base to have the outside diameter of the projection smaller than the diameter of the opening of the cutting blade, a third step of inserting the projection into the opening of the cutting blade, and a fourth step of raising the temperature of the base and thus expanding the base in such a manner that the cutting blade is fixed to the base.

2 Claims, 8 Drawing Sheets

BASE-INTEGRATED BLADE MANUFACTURING METHOD

BACKGROUND OF THE INVENTION

Field of the Invention

The present invention relates to a base-integrated blade manufacturing method for manufacturing a base-integrated blade by fixing a cutting blade to a base.

Description of the Related Art

By dividing a wafer formed with a plurality of devices into individual pieces, a plurality of device chips including respective devices are manufactured. In addition, by covering a plurality of device chips mounted on a mounting substrate with a sealing material including resin (molding resin), a package substrate is formed. By dividing this package substrate into individual pieces, a plurality of package devices including respective packaged device chips are manufactured. The device chips and the package devices are assembled into various electronic appliances such as mobile phones and personal computers.

A cutting apparatus is used for dividing a workpiece such as a wafer and a package substrate. The cutting apparatus includes a chuck table that holds the workpiece, and a cutting unit that cuts the workpiece. The cutting unit incorporates a spindle, and a blade mount that supports an annular cutting blade is fixed to a tip part of the spindle. The cutting blade mounted to the blade mount is rotated and caused to cut into the workpiece, and the workpiece is thus cut and divided. As the cutting blade used for cutting a workpiece, a hub-type cutting blade (hub blade) or a washer-type cutting blade (washer blade or hubless blade) is used. The hub blade has a structure in which an annular base and an annular cutting edge formed along an outer circumferential edge of the base are integrated with each other. In addition, the cutting edge of the hub blade includes electroformed grindstones that contain abrasive grains and a bonding material such as a nickel plating layer for fixing the abrasive grains. On the other hand, the washer blade includes only an annular cutting edge that contains abrasive grains and a bonding material including metal, ceramics, resin, or the like for fixing the abrasive grains.

At the time of cutting a workpiece by the cutting apparatus, a suitable cutting blade is selected according to the material of the workpiece, the purpose of processing, and the like and is mounted to the cutting unit. It is to be noted that the method for mounting the cutting blade to the blade mount varies depending on whether the cutting blade is a hub blade or a washer blade, and the shape, size, and the like of the blade mount also vary depending on the kind of the cutting blade. Therefore, for example, at the time of replacing a hub blade mounted to the cutting unit with a washer blade, a work for replacing a blade mount for the hub blade, which blade mount is fixed to the spindle, with a blade mount for the washer blade is also required. This makes a cutting blade replacing work troublesome. In view of this, a technique of fixing a washer blade to an annular base to form a base-integrated blade has been proposed (see Japanese Patent Laid-open No. 2012-135833). When the base-integrated blade is used, it becomes possible to mount a washer blade to the blade mount for a hub blade, and the cutting blade replacing work is facilitated.

SUMMARY OF THE INVENTION

The base-integrated blade is manufactured by integrating an annular base and an annular cutting blade, which are individually formed, with each other by use of an adhesive. Specifically, a sufficient amount of adhesive for securely fixing the cutting blade to the base is applied to the whole part of a region of the base that makes contact with the cutting blade. Thereafter, the base and the cutting blade are pasted to each other through the adhesive. However, if a considerable amount of adhesive is applied to the base, at the time of pasting, the adhesive is sandwiched between the base and the cutting blade and spreads, and the adhesive may protrude from the pasted region of the base and the cutting blade. In this case, the adhesive may adhere to an outer circumferential part of the cutting blade and adversely affect the processing, or the appearance of the cutting blade may be worsened, so that the quality of the base-integrated blade may be lowered.

The present invention has been made in consideration of such problems. It is an object of the present invention to provide a base-integrated blade manufacturing method which enables omission or reduction of an adhesive for integrating the base and the cutting blade with each other.

In accordance with an aspect of the present invention, there is provided a base-integrated blade manufacturing method for manufacturing a base-integrated blade by fixing a cutting blade having a circular opening to a base having an annular projection. The method includes a first step of preparing the base having the projection that has an outside diameter greater than a diameter of the opening of the cutting blade, and the cutting blade, a second step of lowering a temperature of the base and thus shrinking the base to have the outside diameter of the projection smaller than the diameter of the opening of the cutting blade, a third step of inserting the projection into the opening of the cutting blade, and a fourth step of raising the temperature of the base and thus expanding the base in such a manner that the cutting blade is fixed to the base.

It is to be noted that, preferably, in the first step, a difference between the outside diameter of the projection and the diameter of the opening of the cutting blade is less than 20 μm.

In the base-integrated blade manufacturing method according to one aspect of the present invention, after the base is shrunk to have the outside diameter of the projection smaller than the diameter of the opening of the cutting blade, the projection is inserted into the opening of the cutting blade, and the base is expanded. As a result, it becomes possible to integrate the base and the cutting blade with each other, without using an adhesive or by using only a trace amount of adhesive. As a result, lowering in quality of the base-integrated blade due to protruding of the adhesive is avoided.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
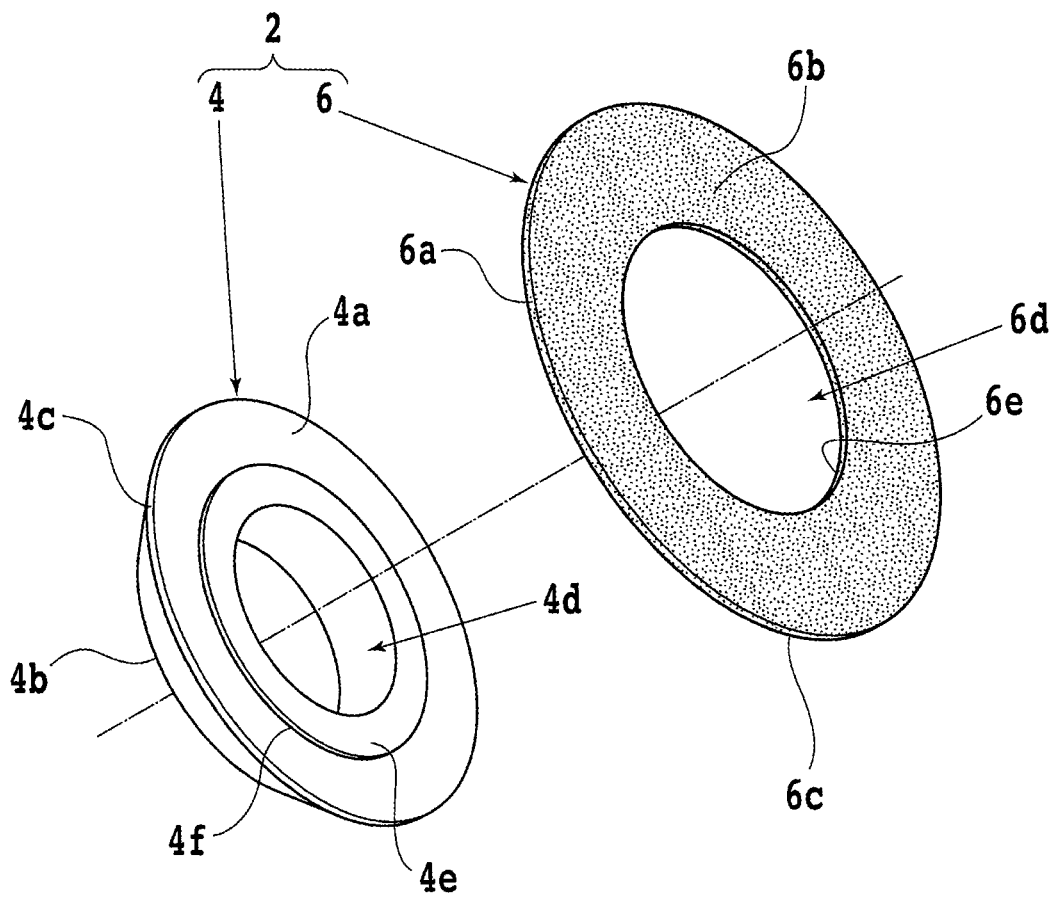
FIG. 1 is an exploded perspective view depicting a base-integrated blade.

An embodiment of the present invention will be described below with reference to the attached drawings. First, a configuration example of a base-integrated blade according to the present embodiment will be described. FIG. 1 is an exploded perspective view depicting a base-integrated blade 2. The base-integrated blade 2 includes an annular base 4 and an annular cutting blade 6.

The base 4 is a disk-shaped member formed of metal such as aluminum and an aluminum alloy and includes a first surface 4a and a second surface 4b, which are substantially parallel to each other, and an outer circumferential edge (side surface) 4c connected to the first surface 4a. In addition, the base 4 is provided at a central part thereof with a circular opening 4d extending from the first surface 4a to the second surface 4b while penetrating the base 4 in its thickness direction. On the first surface 4a side of the base 4, an annular projection 4e projecting from the first surface 4a in the thickness direction of the base 4 is provided. The projection 4e is formed with a predetermined width along an outline of the opening 4d and includes an annular outer circumferential surface (side surface) 4f substantially perpendicular to the first surface 4a.

The cutting blade 6 is a disk-shaped member that includes abrasive grains formed of diamond, cubic boron nitride (cBN), or the like and a bonding material (binder) formed of metal, ceramics, resin, or the like for fixing the abrasive grains. The material of the abrasive grains, the grain diameter of the abrasive grains, the material of the bonding material, and the like are appropriately selected according to the specifications of the base-integrated blade 2. The cutting blade 6 includes a first surface 6a and a second surface 6b which are substantially parallel to each other, and an outer circumferential edge (side surface) 6c connected to the first surface 6a and the second surface 6b. In addition, the cutting blade 6 is provided at a central part thereof with a circular opening 6d which extends from the first surface 6a to the second surface 6b while penetrating the cutting blade 6 in its thickness direction. Further, the cutting blade 6 includes an annular inner circumferential surface (side surface) 6e. The inner circumferential surface 6e is defined by the opening 6d and is exposed on an inside of the opening 6d.

Figure 2:
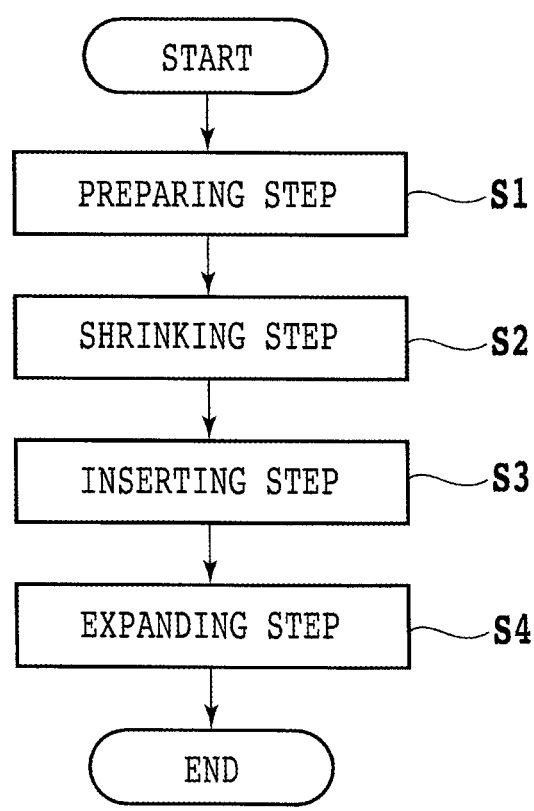
FIG. 2 is a flow chart depicting a base-integrated blade manufacturing method.

By fixing the cutting blade 6 to the base 4, the base-integrated blade 2 is manufactured. A specific example of the base-integrated blade manufacturing method will be described below. FIG. 2 is a flow chart depicting the base-integrated blade manufacturing method. The base-integrated blade manufacturing method according to the present embodiment includes a first step (preparing step) S1, a second step (shrinking step) S2, a third step (inserting step) S3, and a fourth step (expanding step) S4.

Figure 3:
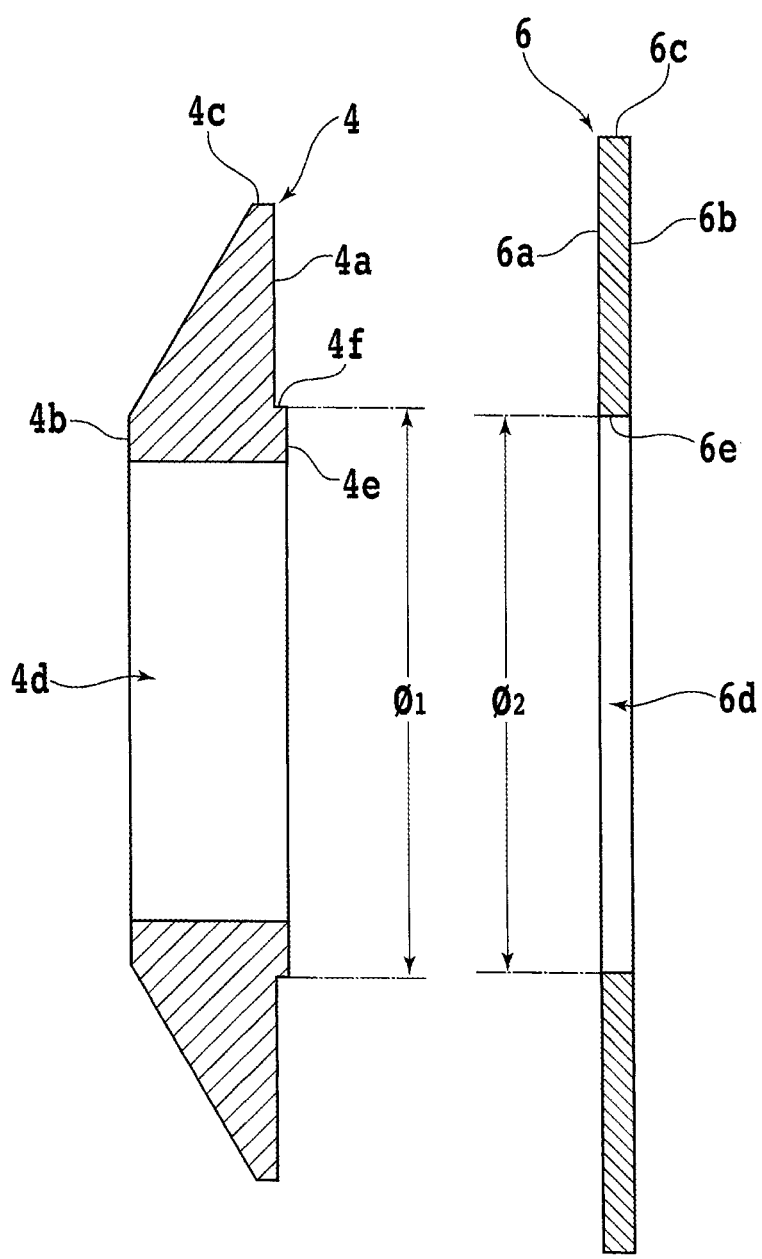
FIG. 3 is a sectional view depicting a base and a cutting blade in a first step.

At the time of manufacturing the base-integrated blade 2, first, the base 4 and the cutting blade 6 are prepared (first step S1). FIG. 3 is a sectional view depicting the base 4 and the cutting blade 6 in the first step S1.

In FIG. 3, $\phi_1$ represents an outside diameter of the projection 4e of the base 4 (diameter of the outer circumferential surface 4f), and $\phi_2$ represents a diameter of the opening 6d of the cutting blade 6 (inside diameter of the cutting blade 6, or diameter of the inner circumferential surface 6e). In the first step S1, the base 4 having the projection 4e having an outside diameter greater than the diameter of the opening 6d of the cutting blade 6, and the cutting blade 6 are prepared. Specifically, the base 4 is designed in such a manner as to satisfy $\phi_1 > \phi_2$ at a predetermined temperature (hereinafter referred to as a reference temperature; for example, 20° C. or 25° C.) in a range of normal temperature (5° C. to 35° C.)

It is to be noted that, in the second step S2 described later (refer to FIG. 4), the base 4 is cooled and thus shrunk to have $\phi_1$ smaller than $\phi_2$. For this purpose, a difference between $\phi_1$ and $\phi_2$ in the first step S1 is set to a value in such a range that $\phi_1$ can be made smaller than $\phi_2$ by cooling of the base 4. For example, when the difference between $\phi_1$ and $\phi_2$ in the first step S1 is set to be less than 20 μm, preferably less than 10 μm, or more preferably less than 5 μm, $\phi_1$ can easily be made smaller than $\phi_2$ in the second step S2 described later.

Figure 4:
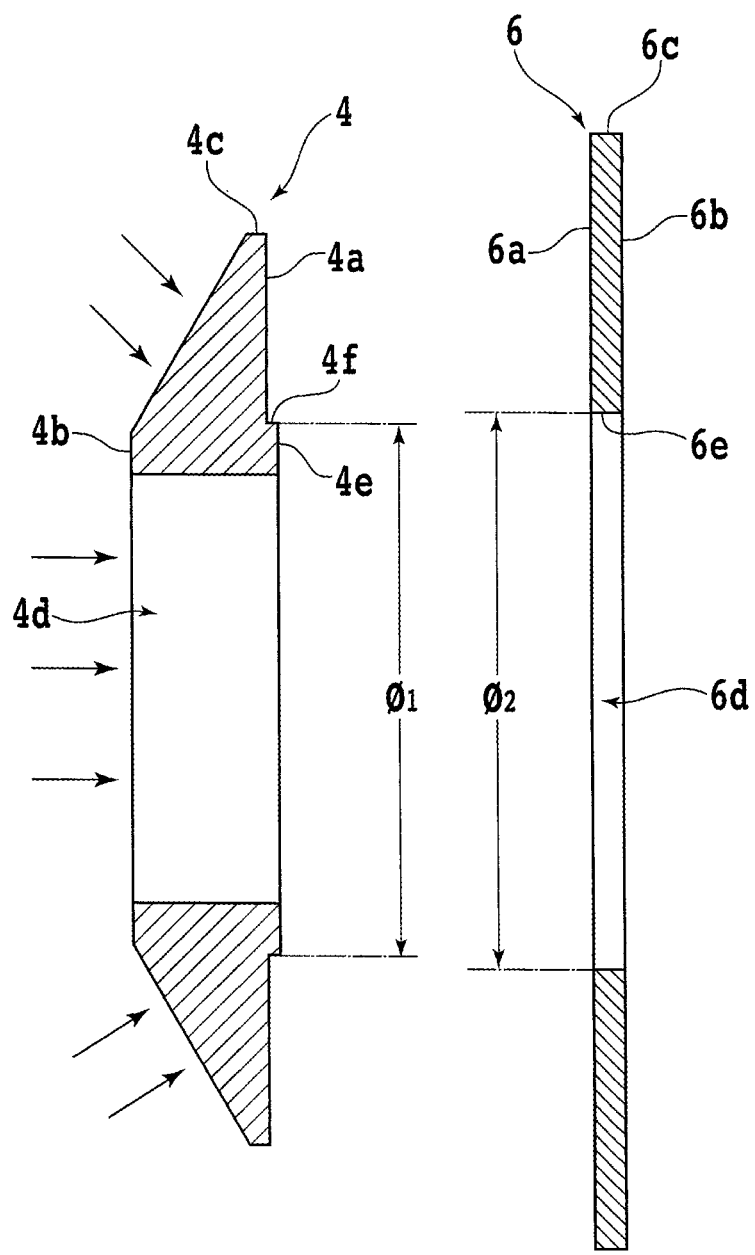
FIG. 4 is a sectional view depicting the base and the cutting blade in a second step.

Next, the base 4 is lowered in temperature and thus shrunk to have the outside diameter of the projection 4e smaller than the diameter of the opening 6d of the cutting blade 6 (second step S2). FIG. 4 is a sectional view depicting the base 4 and the cutting blade 6 in the second step S2.

In the second step S2, the base 4 is cooled and the temperature of the base 4 is lowered, for example, by storing the base 4 in a refrigerator or a freezer for a predetermined period of time. As a result, the whole part of the base 4 is shrunk, and the outside diameter $\phi_1$ of the projection 4e is reduced. The base 4 is cooled until the outside diameter $\phi_1$ of the projection 4e becomes smaller than the diameter $\phi_2$ of the opening 6d of the cutting blade 6. Consequently, the projection 4e can be inserted into the opening 6d of the cutting blade 6. It is to be noted that the method for cooling the base 4 is not limited. For example, the base 4 may be placed on a metallic support plate which is cooled, or may be exposed to a cool airflow or cold water.

The cooling conditions (cooling temperature, cooling period of time, and the like) of the base 4 are set according to the material and size of the base 4. For example, assumed is a case where the material of the base 4 is A5052 (refer to the Japanese Industrial Standards; linear expansion coefficient $23.8 \times 10^{-6}$/° C.) which is a kind of an aluminum alloy that contains magnesium (Al—Mg alloy) and where the outside diameter $\phi_1$ of the projection 4e is 40 mm. In this case, by cooling the base 4 to lower the temperature of the base 4 by approximately 20° C. from the reference temperature, the outside diameter $\phi_1$ of the projection 4e can be reduced by approximately 20 μm. Therefore, if the difference between $\phi_1$ and $\phi_2$ in the first step S1 is less than 20 μm, it is possible to insert the projection 4e into the opening 6d of the cutting blade 6.

Figure 5:
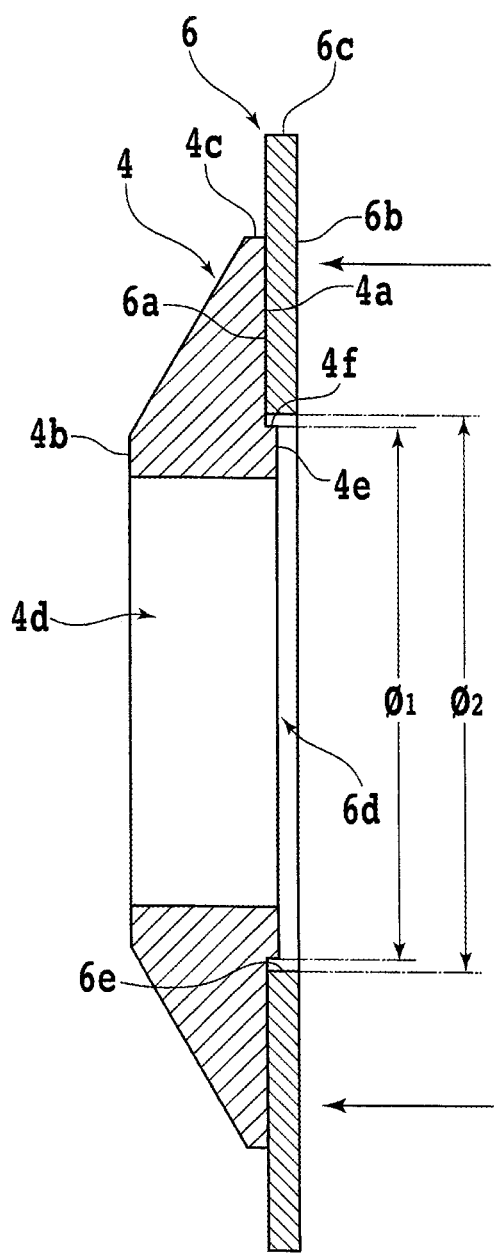
FIG. 5 is a sectional view depicting the base and the cutting blade in a third step.

Subsequently, the projection 4e of the base 4 is inserted into the opening 6d of the cutting blade 6 (third step S3). FIG. 5 is a sectional view depicting the base 4 and the cutting blade 6 in the third step S3.

In the third step S3, the base 4 and the cutting blade 6 are disposed in such a manner that the center of the base 4 and the center of the cutting blade 6 overlap, and the first surface 4a of the base 4 and the first surface 6a of the cutting blade 6 are brought into contact with each other. As a result, the projection 4e of the base 4 is inserted into the opening 6d of the cutting blade 6. It is to be noted that, at a stage immediately after the projection 4e of the base 4 is inserted into the opening 6d of the cutting blade 6, the outside diameter $\phi_1$ of the projection 4e is smaller than the diameter $\phi_2$ of the opening 6d of the cutting blade 6, and a slight gap is present between the outer circumferential surface 4f of the projection 4e and the inner circumferential surface 6e of the cutting blade 6. Therefore, although the cutting blade 6 makes contact with the base 4, it is not fixed to the base 4.

Figure 6:
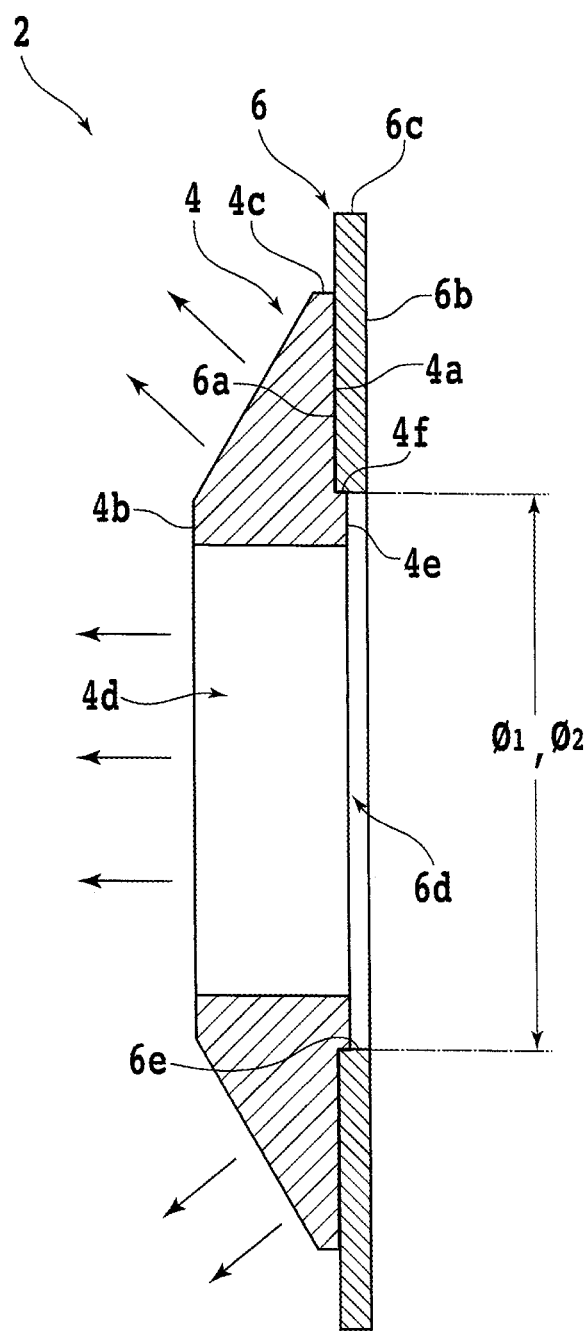
FIG. 6 is a sectional view depicting the base and the cutting blade in a fourth step.

Next, the base 4 is raised in temperature and thus expanded in such a manner that the cutting blade 6 is fixed to the base 4 (fourth step S4). FIG. 6 is a sectional view depicting the base 4 and the cutting blade 6 in the fourth step S4.

For example, in the fourth step S4, the base 4 and the cutting blade 6 are stored on a support plate set in a room of the reference temperature for a predetermined period of time. This gradually raises the temperature of the base 4 and expands the whole part of the base 4, and the outside diameter $\phi_1$ of the projection 4e increases. When the base 4 is expanded until the outside diameter $\phi_1$ of the projection 4e reaches the diameter $\phi_2$ of the opening 6d of the cutting blade 6, the outer circumferential surface 4f of the projection 4e comes into contact with the inner circumferential surface 6e of the cutting blade 6, so that the projection 4e is fixed inside the opening 6d of the cutting blade 6. As a result, the cutting blade 6 is fixed to the base 4, and the base 4 and the cutting blade 6 are integrated with each other. In this way, the base-integrated blade 2 including the base 4 and the cutting blade 6 is formed.

It is to be noted that, in the fourth step S4, the base 4 may be expanded by being subjected to a heat treatment. For example, the base 4 and the cutting blade 6 are placed on a heated metallic support plate to heat the base 4. Alternatively, the base 4 may be exposed to a warm airflow or warm water. By such an operation, the temperature rise of the base 4 can be accelerated, and the period of time required for the expansion of the base 4 can be shortened.

After the fourth step S4 is carried out, an outside diameter of the cutting blade 6 (diameter of the outer circumferential edge 6c) is greater than an outside diameter of the base 4 (diameter of the outer circumferential edge 4c). In addition, when the cutting blade 6 is fixed to the base 4 by the expansion of the base 4, the base 4 and the cutting blade 6 are disposed concentrically, and the base 4 and the cutting blade 6 are aligned with each other. As a result, obtained is a state in which an outer circumferential part of the cutting blade 6 projects toward a radially outer side of the base 4 from the outer circumferential edge 4c of the base 4.

In addition, after the fourth step S4 is carried out, a height (projection amount from the first surface 4a) of the projection 4e is preferably equal to or less than a thickness of the cutting blade 6. In this case, the projection 4e does not project from the second surface 6b side of the cutting blade 6. As a result, at the time of mounting the base-integrated blade 2 to a blade mount 34 (refer to FIG. 8), hampering of the mounting of the base-integrated blade 2 due to contact of the projection 4e with the blade mount 34 can be avoided.

As has been described above, the base 4 and the cutting blade 6 are integrated with each other by utilizing the shrinking and expansion of the base 4, so that the cutting blade 6 can be fixed to the base 4 without using an adhesive. As a result, lowering in quality of the base-integrated blade 2 due to protruding of the adhesive is avoided. It is to be noted that, for assisting the fixation of the cutting blade 6 to the base 4, a trace amount of adhesive may be applied to the base 4 or the cutting blade 6. For example, a trace amount of adhesive may be applied to a partial region of the first surface 4a of the base 4, the partial region being located on the inner side of the outer circumferential edge 4c. In this case, in addition to the contact between the outer circumferential surface 4f of the projection 4e and the inner circumferential surface 6e of the cutting blade 6, an adhesive force of the adhesive also contributes to the fixation of the cutting blade 6, so that the base 4 and the cutting blade 6 are firmly integrated with each other. In addition, since the amount of adhesive is significantly reduced as compared with the conventional method for integrating the base 4 and the cutting blade 6 with each other by only the action of the adhesive, protruding of the adhesive is not liable to occur.

As described above, in the base-integrated blade manufacturing method according to the present embodiment, after the base 4 is shrunk to have the outside diameter of the projection 4e smaller than the diameter of the opening 6d of the cutting blade 6, the projection 4e is inserted into the opening 6d of the cutting blade 6, and the base 4 is expanded. As a result, the base 4 and the cutting blade 6 can be integrated with each other without using an adhesive or by using only a trace amount of adhesive. Accordingly, lowering in quality of the base-integrated blade 2 due to protruding of the adhesive is avoided.

Figure 7:
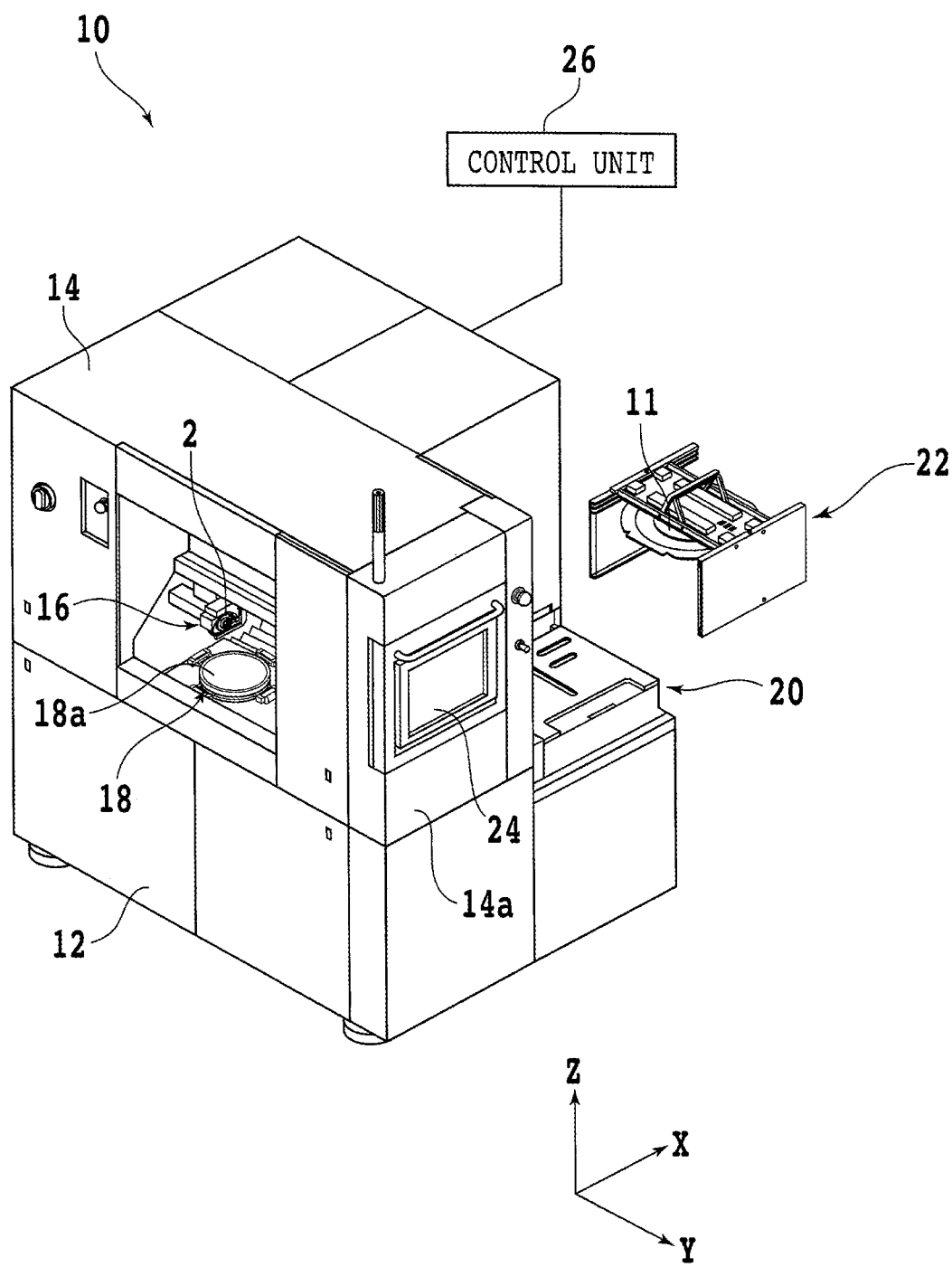
FIG. 7 is a perspective view depicting a cutting apparatus.

The base-integrated blade 2 obtained by the base-integrated blade manufacturing method described above is mounted to a cutting apparatus and used for cutting of a workpiece. FIG. 7 is a perspective view depicting a cutting apparatus 10 that cuts a workpiece 11. It is to be noted that, in FIG. 7, an X-axis direction (a processing-feed direction, a left-right direction, or a first horizontal direction) and a Y-axis direction (an indexing-feed direction, a forward-backward direction, or a second horizontal direction) are directions which are perpendicular to each other. In addition, a Z-axis direction (a vertical direction, an upward-downward direction, or a height direction) is a direction which is perpendicular to the X-axis direction and the Y-axis direction.

The workpiece 11 is, for example, a disk-shaped wafer formed of a semiconductor material such as silicon. The workpiece 11 is partitioned into a plurality of rectangular regions by a plurality of streets (planned division lines) that are arranged in a grid pattern in such a manner as to intersect each other. In addition, in the plurality of regions partitioned by the streets, devices such as an integrated circuit (IC), a large scale integration (LSI) circuit, and a micro electromechanical systems (MEMS) device are formed. By cutting and dividing the workpiece 11 along the streets by the cutting apparatus 10, a plurality of device chips including the respective devices are manufactured.

It is to be noted that the material, shape, structure, size, and the like of the workpiece 11 are not limited. For example, the workpiece 11 may be a substrate formed of a semiconductor other than silicon (GaAs, InP, GaN, SiC, or the like), glass, ceramics, resin, metal, or the like. In addition, the kind, number, shape, structure, size, layout, and the like of the devices are not limited either, and the workpiece 11 may not be formed with any device. Further, the workpiece 11 may be a package substrate such as a chip size package (CSP) substrate or a quad flat non-leaded package (QFN) substrate. The package substrate is formed, for example, by sealing with a resin layer (molding resin) a plurality of device chips mounted on a mounting substrate. By dividing the package substrate into individual pieces, a plurality of package devices including the respective packaged device chips are manufactured.

The cutting apparatus 10 includes a base 12 for supporting or accommodating each constituent element constituting the cutting apparatus 10. On the upper side of the base 12, a cover 14 which covers an upper surface side of the base 12 is provided. Inside the cover 14, a space (processing chamber) in which processing of the workpiece 11 is conducted is defined. In the processing chamber inside the cover 14, a cutting unit 16 to which the base-integrated blade 2 is to be mounted is provided. A ball-screw-type moving mechanism (not illustrated) for moving the cutting unit 16 in the Y-axis direction and the Z-axis direction is connected to the cutting unit 16.

On the lower side of the cutting unit 16, a chuck table (holding table) 18 that holds the workpiece 11 is provided. An upper surface of the chuck table 18 is a flat surface substantially parallel to a horizontal plane (XY plane) and constitutes a holding surface 18a to hold the workpiece 11 thereon. The holding surface 18a is connected to a suction source (not illustrated) such as an ejector through a flow line (not illustrated), a valve (not illustrated), or the like formed inside the chuck table 18. When the workpiece 11 is placed on the holding surface 18a and a suction force (negative pressure) of the suction source is made to act on the holding surface 18a, the workpiece 11 is held under suction by the chuck table 18. A ball-screw-type moving mechanism (not illustrated) for moving the chuck table 18 in the X-axis direction is connected to the chuck table 18. In addition, a rotational drive source (not illustrated) such as a motor for rotating the chuck table 18 around a rotational axis that extends in substantially parallel with the Z-axis direction is connected to the chuck table 18.

At a corner part on the front side of the base 12, a cassette elevator 20 is disposed. On the cassette elevator 20, there is disposed a cassette 22 that is capable of accommodating the workpiece 11. The cassette elevator 20 adjusts a height of the cassette 22 in such a manner that conveying-out of the workpiece 11 from the cassette 22 and conveying-in of the workpiece 11 into the cassette 22 are conducted suitably.

On a front surface 14a side of the cover 14, there is provided a display unit (display section or display device) 24 for displaying various kinds of information concerning the cutting apparatus 10. For example, a touch-panel-type display is used as the display unit 24. In this case, the display unit 24 functions also as an input section (input unit or input device) for inputting various kinds of information to the cutting apparatus 10, and an operator can input information such as processing conditions to the cutting apparatus 10 by performing touch operations on the display unit 24. In other words, the display unit 24 functions as a user interface.

Each of the constituent elements (the cutting unit 16, the chuck table 18, the cassette elevator 20, the display unit 24, and the like) constituting the cutting apparatus 10 is connected to a control unit (control section or controller) 26. The control unit 26 outputs a control signal to each constituent element of the cutting apparatus 10, thereby controlling operation of the cutting apparatus 10. For example, the control unit 26 includes a computer, and includes a calculation section for performing calculations necessary for the operation of the cutting apparatus 10 and a storage section for storing various kinds of information (data, program, and the like) used for the operation of the cutting apparatus 10. The calculation section includes a processor such as a central processing unit (CPU). In addition, the storage section includes a memory such as a read only memory (ROM) and a random access memory (RAM).

Figure 8:
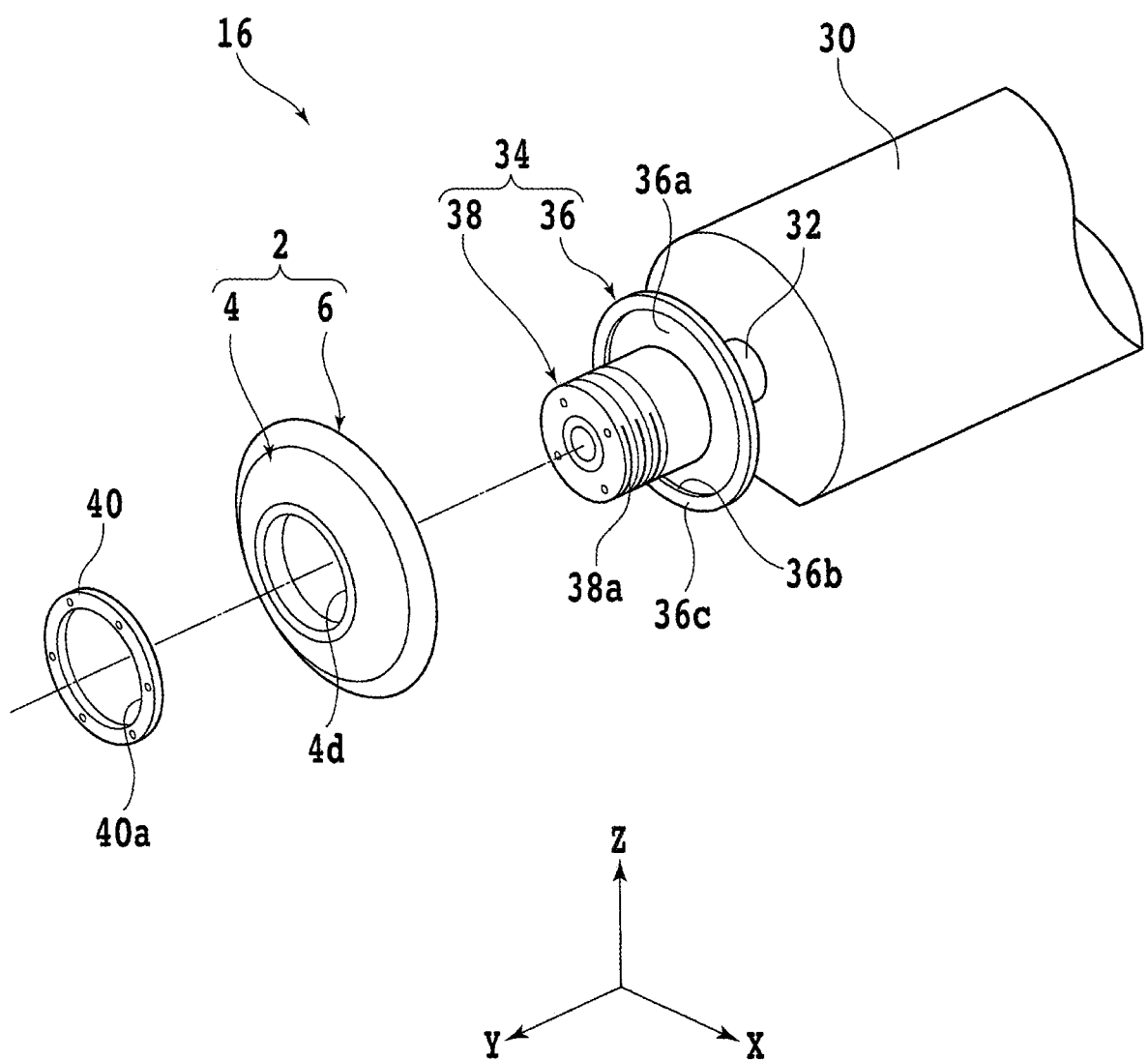
FIG. 8 is an exploded perspective view depicting a cutting unit.

FIG. 8 is an exploded perspective view depicting the cutting unit 16. The cutting unit 16 includes a tubular housing 30, and a cylindrical spindle 32 disposed along the Y-axis direction is accommodated in the housing 30. A tip part (one end part) of the spindle 32 is exposed to the exterior of the housing 30, and a rotational drive source (not illustrated) such as a motor is connected to a base end part (the other end part) of the spindle 32.

The blade mount 34 is fixed to the tip part of the spindle 32. The blade mount 34 includes a disk-shaped flange section 36 and a cylindrical boss section (support shaft) 38 projecting from a central part of a front surface 36a of the flange section 36. On the front surface 36a side of an outer circumferential part of the flange section 36, there is provided an annular projection 36b projecting from the front surface 36a. A tip surface of the projection 36b is a flat surface substantially parallel to the front surface 36a and constitutes a support surface 36c that supports the base-integrated blade 2. In addition, an outer circumferential surface of a tip part of the boss section 38 is formed with a male screw section (screw groove) 38a.

An annular fixing nut 40 is fastened to the male screw section 38a of the boss section 38. The fixing nut 40 is provided at a central part thereof with a circular opening 40a that penetrates the fixing nut 40 in its thickness direction. The opening 40a is formed to be substantially the same in diameter as the boss section 38. In addition, a female screw section (screw groove) corresponding to the male screw section 38a of the boss section 38 is provided on an inner circumferential surface of the fixing nut 40, the inner circumferential surface being exposed to the opening 40a.

When the base-integrated blade 2 is positioned in such a manner that the boss section 38 is inserted into the opening 4d of the base 4 and the opening 6d of the cutting blade 6 (refer to FIG. 1 and the like), the base-integrated blade 2 is mounted to the blade mount 34. With the fixing nut 40 fastened to the male screw section 38a of the boss section 38 in this state, the base-integrated blade 2 is clamped between the support surface 36c of the flange section 36 and the fixing nut 40. In this way, the base-integrated blade 2 is fixed to the tip part of the spindle 32.

The base-integrated blade 2 is rotated around a rotational axis that extends in substantially parallel with the Y-axis direction, by a motive power transmitted from the rotational drive source through the spindle 32 and the blade mount 34. While rotating the base-integrated blade 2, a tip part of the cutting blade 6 is caused to cut into the workpiece 11 held by the chuck table 18 (refer to FIG. 7), thereby cutting the workpiece 11.

It is to be noted that the structure, method, and the like according to the present embodiment can appropriately be modified in carrying out the present invention unless departing from the scope of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A base-integrated blade manufacturing method for manufacturing a base-integrated blade by fixing a cutting blade having a circular opening to a base having an annular projection, the method comprising:

a first step of preparing the base having the projection that has an outside diameter greater than a diameter of the opening of the cutting blade, and the cutting blade;

a second step of lowering a temperature of the base and thus shrinking the base to have the outside diameter of the projection smaller than the diameter of the opening of the cutting blade;

a third step of inserting the projection into the opening of the cutting blade; and a fourth step of raising the temperature of the base and thus expanding the base in such a manner that the cutting blade is fixed to the base.

2. The base-integrated blade manufacturing method according to claim 1, wherein, in the first step, a difference between the outside diameter of the projection and the diameter of the opening of the cutting blade is less than 20 µm.

\* \* \* \* \*